United States Patent [19]

Scharpenberg et al.

[11] Patent Number: 4,637,912
[45] Date of Patent: Jan. 20, 1987

[54] APPARATUS FOR INSPECTING FUEL ASSEMBLIES, PARTICULARLY FOR DETECTING DEFECTIVE FUEL RODS FROM COMPLETE FUEL ASSEMBLIES OF WATER-COOLED NUCLEAR REACTORS

[75] Inventors: Rainer Scharpenberg, Waldmichelbach; Günter Bäro, Weinheim, both of Fed. Rep. of Germany

[73] Assignee: Brown Boveri Reaktor GmbH, Mannheim, Fed. Rep. of Germany

[21] Appl. No.: 497,906

[22] Filed: May 25, 1983

[30] Foreign Application Priority Data

May 27, 1982 [DE] Fed. Rep. of Germany ....... 3219938

[51] Int. Cl.[4] .............................................. G21C 17/00
[52] U.S. Cl. .................................................... 376/245
[58] Field of Search ............... 376/245, 249, 251, 252; 200/61.42

[56] References Cited

U.S. PATENT DOCUMENTS

| 2,730,585 | 1/1956 | Obermoser | 200/61.42 |
| 3,621,580 | 11/1971 | Tovaglieri | 376/245 |
| 3,901,090 | 8/1975 | Akey et al. | 376/245 |
| 4,048,009 | 9/1977 | Weilbacher | 376/245 |
| 4,193,843 | 3/1980 | Womack et al. | 376/252 |
| 4,274,205 | 6/1981 | Starr et al. | 376/245 |

FOREIGN PATENT DOCUMENTS

| 0051016 | 5/1982 | European Pat. Off. | 376/252 |
| 2659555 | 7/1978 | Fed. Rep. of Germany | 376/252 |

Primary Examiner—Deborah L. Kyle
Assistant Examiner—Richard W. Wendtland
Attorney, Agent, or Firm—Herbert L. Lerner; Laurence A. Greenberg

[57] ABSTRACT

An apparatus for inspecting fuel assemblies, includes a water container, a receptacle disposed in the container for securing bases of fuel assemblies vertically disposed in said container, a beam, a plurality of fingers engaged by the beam, measuring probes supported on the fingers, and a guiding device disposed in the container and accurately positioned relative to the receptacle for guiding the beam laterally toward the fuel assemblies for inserting the measuring probes in a given direction into spaces between cladding tubes of fuel rods of the fuel assemblies, each of the fingers being movable relative to the given insertion direction after striking an obstacle.

9 Claims, 8 Drawing Figures

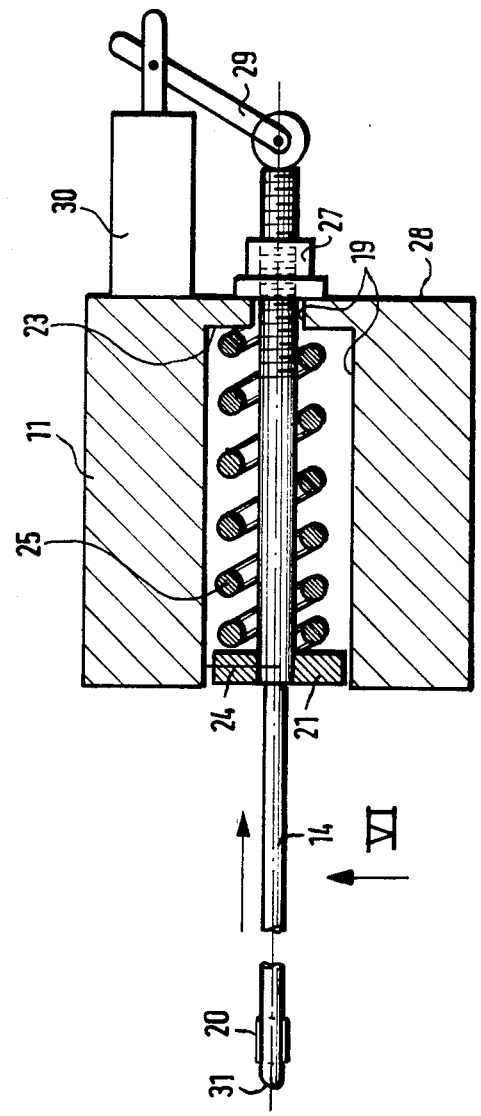
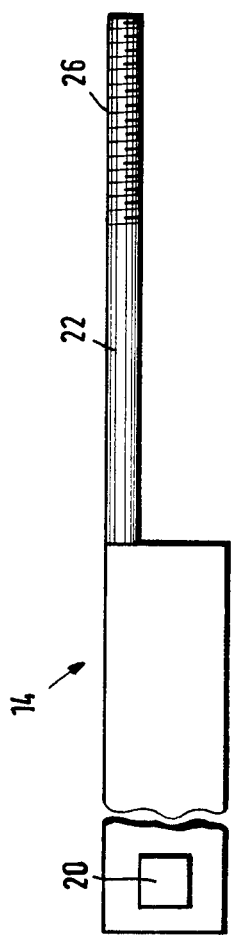
Fig. 5
Fig. 6

APPARATUS FOR INSPECTING FUEL ASSEMBLIES, PARTICULARLY FOR DETECTING DEFECTIVE FUEL RODS FROM COMPLETE FUEL ASSEMBLIES OF WATER-COOLED NUCLEAR REACTORS

The invention relates to an apparatus for inspecting fuel assemblies, particularly for detecting defective fuel rods from a complete fuel assembly of water-cooled nuclear reactors, wherein the fuel assembly is vertically disposed in a water purifyer or container, a beam or carrier equipped with several fingers is brought toward the fuel assembly from the side and measuring probes supported by the fingers can be introduced into spaces between the cladding tubes of the fuel rods.

Such an apparatus is known from German Published, Non-Prosecuted Application DE-OS No. 26 05 962. In that device, the guiding device for the beam carrying the finger is disposed at the mast of the fuel assembly changing machine. When manipulating within the water tank, this leads to difficulties in inserting the fingers into the interspaces in accurate position. The fingers are furthermore rigidly connected to the beam, so that damage to the fingers and to the measuring probes (such as ultrasonic oscillators) fastened thereto is not impossible if the positioning is incorrect. At times, individual rods become bent during the operation of the nuclear reactor, so that the space between two rods is narrowed to such an extent that it is no longer possible to insert a finger. A rigid mounting of the fingers thus results in the consequence that because of the presence of a single bent rod, no other rod of the corresponding row can be tested either.

It is accordingly an object of the invention to provide an apparatus for inspecting fuel assemblies, particularly for detecting defective fuel rods from complete fuel assemblies of water-cooled nuclear reactors, which overcomes the hereinafore-mentioned disadvantages of the heretofore-known devices of this general type, and by means of which an exact positioning of the testing device is possible, damage to the fingers is impossible, and the operation of the remaining fingers is maintained if one finger is blocked.

With the foregoing and other objects in view there is provided, in accordance with the invention, an apparatus for inspecting fuel assemblies, especially for detecting defective fuel rods from a complete fuel assembly of water-cooled nuclear reactors, comprising a water container or purifier, a receptacle disposed in the container for securing bases of fuel assemblies vertically disposed in the container, a beam or carrier, a plurality of fingers engaged by the beam, measuring probes supported on the fingers, and a guiding device disposed in the container and accurately positioned relative to the receptacle for guiding the beam laterally toward the fuel assemblies for inserting the measuring probes in a given direction into spaces between cladding tubes of fuel rods of the fuel assemblies, each of the fingers being movable relative to the given insertion direction after striking an obstacle.

With this apparatus, damage to the fingers as well as the failure of all of the fingers in case of a disturbance of a single finger motion, is prevented in a simple manner.

In accordance with another feature of the invention, there is provided a common base plate disposed in the container on which the guiding device and the receptacle are fastened.

In accordance with a further feature of the device, the receptacle is a turntable being lockable in different positions. This ensures that exact positioning is possible even for redundant testing operations from different sides of the fuel assembly.

In accordance with an added feature of the invention, the beam has a step-shaped cutout formed therein defining a surface of the beam at the bottom of the cutout, and the fingers pass through the cutout with an end carrying the sensors and another end, each protruding beyond the beam from respective opposite ends of the cutout, and including a stop fastened to each respective finger, a compression spring clamped around each respective finger between the stop and the surface at the bottom of the cutout, and a setting nut disposed on the other end of each respective finger being movable into contact with an outer surface of the beam. This is done in order to ensure the relative mobility of the fingers.

In accordance with an additional feature of the invention, the beam has a feedthrough formed therein having a rectangular cross section defining wide inner surfaces of the beam, and the wide inner surfaces having pairs of opposite recesses formed therein, and including a ball disposed in one recess of each of the pairs and a ball and compression spring disposed in the other recess of each of the pairs, each of the balls having a portion of the periphery thereof extended into the feedthrough, each of the fingers pass through the feedthrough with an end protruding out of the beam and with protuberances formed on the fingers protruding toward the wide inner surfaces for contacting the portion of the periphery of the balls, for permitting motion of the fingers relative to the given insertion direction after the force of the compression springs is overcome by the protuberances, and a stop disposed on each respective end of the fingers for contacting an outer surface of the beam.

In accordance with again another feature of the invention, there is provided a lever engaged by the end of the finger facing away from the measuring probe, and a switch being operated by the lever for indicating relative motion of the finger.

In accordance with again a further featuer of the invention, the guiding device is in the form of tracks fastened to the common base plate.

In accordance with again an added feature of the invention, there are provided means disposed between the guiding device and the receptacle for supporting the fingers.

In accordance with a concomitant feature of the invention, there is provided another beam disposed perpendicular (offset or staggered by 90°) to the first-mentioned beam and other fingers engaged by the other beam, the other fingers being staggered in height relative to the first-mentioned fingers for permitting simultaneous testing of feed assemblies from two sides. This alternative embodiment can replace the embodiment with a turntable.

Other features which are considered as characteristic for the invention are set forth in the appended claims.

Although the invention is illustrated and described herein as embodied in an apparatus for inspecting fuel assemblies, particularly for detecting defective fuel rods from complete fuel assemblies of water-cooled nuclear reactors, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in conncetion with the accompanying drawings, in which:

FIG. 5 is a fragmentary, enlarged, cross sectional view of the beam in vicinity of a finger;

FIG. 6 is a side elevational view of a finger as seen in direction of the arrow VI in FIG. 5;

Figure 1:
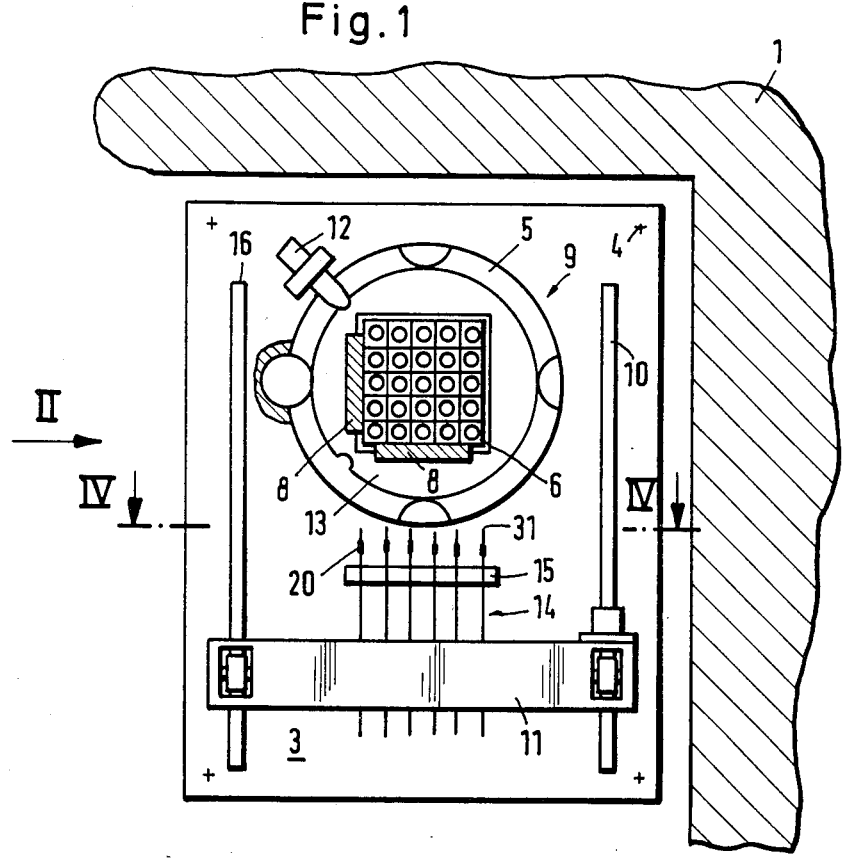
FIG. 1 is a fragmentary, diagrammatic, top plan and partially cross-sectional view of the apparatus of the invention.
Figure 2:
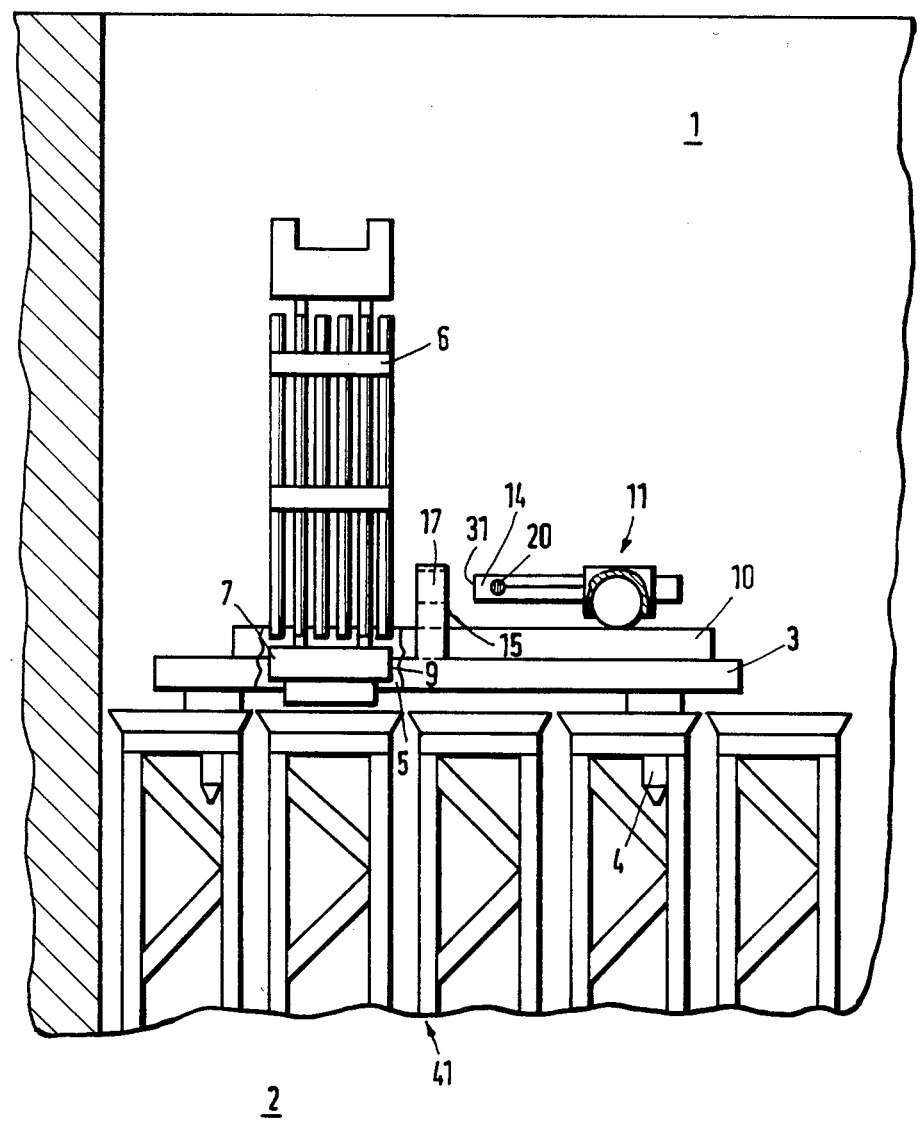
FIG. 2 is a fragmentary side elevational and partly cross-sectional view in the direction of the arrow II in FIG. 1.

Referring now to the figures of the drawing and first particularly to FIGS. 1 and 2 thereof, there is seen a water container in the form of a fuel assembly storage pit or water purifyer 1 having a bottom 2 on which a fuel assembly storage rack 41 is disposed. A base plate 3 is held by bolts 4 in the storage rack 41. A receptacle 5, which is constructed as a turntable, is supported in the base plate 3 for securing a fuel assembly 6 through the base 7 thereof. The base 7 of the fuel assembly 6 is brought by two clamping elements 8 into a position predetermined by a recess 9 formed in the receptacle 5. In this way, the respective fuel assembly to be tested occupies the desired test position. The position is determined relative to tracks 10 which are likewise fastened to the base plate, for guiding a beam 11. A locking device 12 is provided which permits a movement of a turntable 13 through 90°, so that for redundancy reasons, all fuel rods of a fuel assembly 6 can be insonified once more from a direction which is shifted through 90°.

Figure 3:
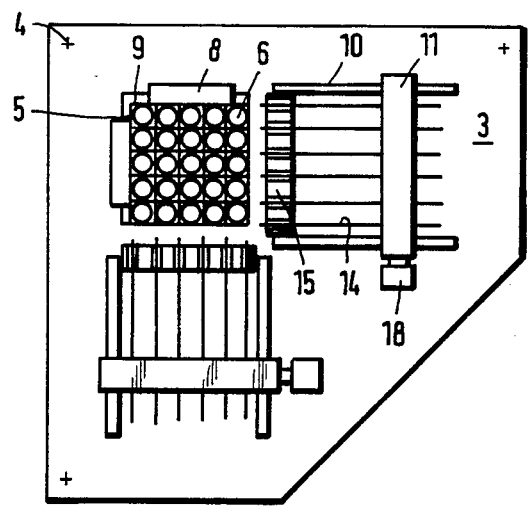
FIG. 3 is a top plan view of another embodiment of the apparatus.
Figure 4:
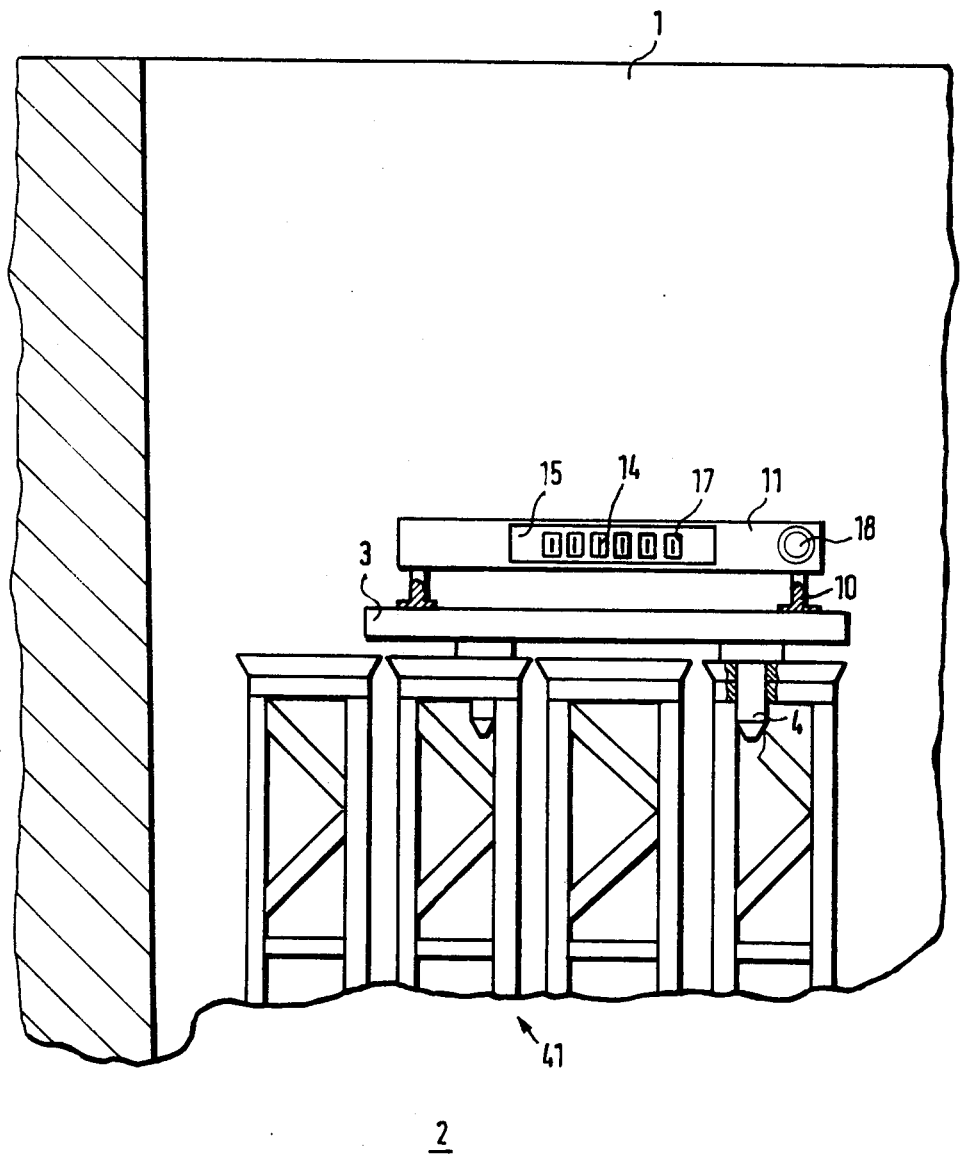
FIG. 4 is a fragmentary, cross-sectional view taken along the line IV—IV of FIG. 1, in the direction of the arrows.

An alternative to the turntable structure can be seen in FIG. 3, wherein the receptacle 5 for the fuel assembly base 7 is fastened to the base plate 3 in a stationary position. The base of the fuel assembly and therefore the fuel assembly itself is held in the position determined by the recess 9 of the receptacle 5, by clamping elements. In FIG. 3, two beams or carriers 11 carrying fingers 14 are shifted relative to each other by 90°, whereas in FIGS. 1 and 2 one beam carries the fingers. Measuring or test probes 20 are disposed on the fingers so that they can be inserted into spaces between cladding tubes of fuel rods. The cladding tubes of a fuel assembly in FIG. 3 can therefore be tested from two sides without performing a 90° rotation, for enhancing the test result. In order to permit the test to be performed simultaneously from two sides, the fingers of one beam are offset in height relative to the fingers of the other beam, in such a manner that the fingers of the different beams do not interfere with each other. The beam 11 can be moved together with the fingers 14 along the tracks 10. In both embodiments, a guide comb 15 is fastened between the receptacle 5 and an end 16 of the tracks 10 on the base plate 3. The guide comb 15 has openings 17 formed therein in which one finger 14 is always guided with support on at least two opposite sides, as seen in FIG. 4. Distance transducers 18 seen in FIG. 4 provide information regarding the position of the beam during its motion along the tracks. As can be seen from FIG. 5, one finger 14 always passes through the beam 11 in vicinity of a stepped hole 19. As seen in FIGS. 5 and 6, the finger is constructed as a round bar 22 up to the height or level of a stop 21. The round bar 22 is provided at its free end with a thread 26 for receiving a setting nut 27. The part of the finger between the stop 21 and an end 31 of the finger has a rectangular cross section measuring approximately 20×1 mm. A stop 21 is connected by a pin 24 to the round bar 22. A compression spring 25 is clamped between a bottom 23 of the stepped hole 19 and the stop 21, in order to permit motion of the finger relative to the motion of the beam 11. A lever 29 for operating a switch 30 engages the end of the finger carrying the setting nut 27. The switch registers the relative motion of the finger.

Figure 7:
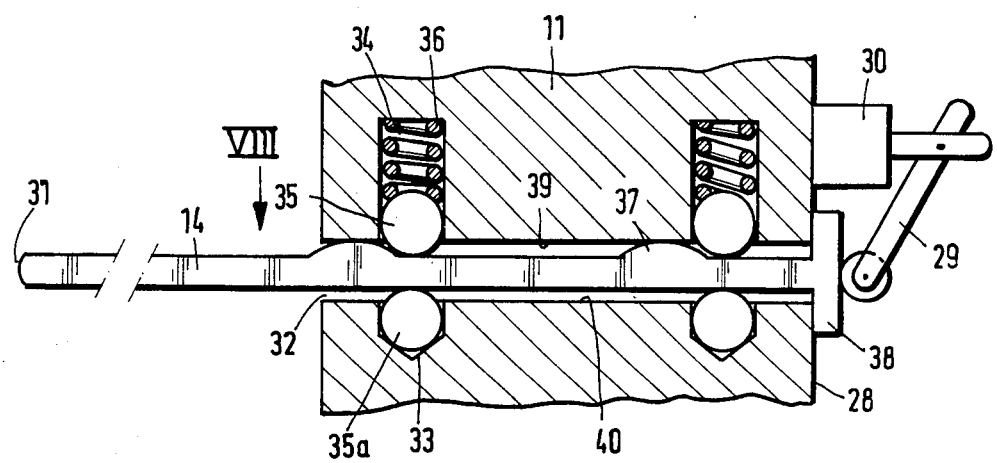
FIG. 7 is a fragmentary, partially cross-sectional view of another construction of the beam in vicinity of a finger.
Figure 8:
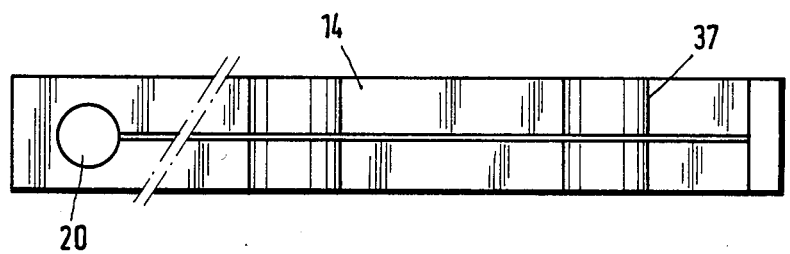
FIG. 8 is a side elevational view of a finger as seen in direction of the arrow VIII in FIG. 7.

FIGS. 7 and 8 show another construction of the fingers and another manner of connecting the fingers 14 to the beam 11. The beam is provided with a feedthrough 32 having a rectangular cross section, for receiving the finger. Opposite wide sides 39, 40 of the feedthrough are provided with recesses 33, 34 for receiving a ball 35a and a ball 35, respectively, as well as a compression spring 36. In this construction, a recess provided with a ball is always opposite a recess provided with a ball and a compression spring. The finger held in the feedthrough 32 has a substantially rectangular cross section. The finger only has two bumps or protuberances 37 provided with a rounded surface, as well as a stop 38 resting against the rear surface 28 of the beam 11. The force of the compression springs 36 is chosen in such a way that the finger remains in the position shown in FIG. 7 if the testing cycle is undisturbed. If, however, the end 31 of the finger 14 hits against an obstacle, the compression springs are compressed by the bumps 37 and the balls 35. A relative motion can thus be carried out which is harmless to the testing device and is registered by the lever 29 and the switch 30.

The foregoing is a description corresponding in substance to German Application P No. 32 19 938.4, dated May 27, 1982, the International priority of which is being claimed for the instant application, and which is hereby made part of this application. Any material discrepancies between the foregoing specification and the aforementioned corresponding German application are to be resolved in favor of the latter.

We claim:

1. Apparatus for inspecting fuel assemblies, comprising a water container, a receptacle disposed in said container for securing bases of fuel assemblies vertically disposed in said container, a beam, a plurality of fingers engaged by said beam, measuring probes supported on said fingers, means disposed in said container at a given position relative to said receptacle for guiding said beam laterally toward said fuel assemblies for inserting said measuring probes in a given direction into spaces between cladding tubes of fuel rods of the fuel assemblies, means for fixing the position of said receptacle and said guiding means relative to each other, said position fixing means being in the form of a common base plate disposed in said container on which said guiding means and said receptacle are fastened, and means for permitting movement of said fingers relative to said given insertion direction after striking an obstacle.

2. Apparatus according to claim 1, wherein said receptacle is a turntable being lockable in different positions.

3. Apparatus according to claim 1, wherein said beam has a step-shaped cutout formed therein defining a surface of said beam at the bottom of said cutout, and said fingers pass through said cutout with an end carrying said sensors and another end, each protruding beyond said beam from respective opposite ends of said cutout, and including a stop fastened to each respective finger, a compression spring clamped around each respective finger between said stop and said surface at the bottom of said cutout, and a setting nut disposed on said other end of each respective finger being movable into contact with an outer surface of said beam.

4. Apparatus according to claim 1, wherein said beam has a feedthrough formed therein having a rectangular cross section defining wide inner surfaces of said beam, and said wide inner surfaces having pairs of opposite recesses formed therein, and including a ball disposed in one recess of each of said pairs and a ball and compression spring disposed in the other recess of each of said pairs, each of said balls having a portion of the periphery thereof extended into said feedthrough, each of said fingers pass through said feedthrough with an end protruding out of said beam and with protuberances formed on said fingers protruding toward said wide inner surfaces for contacting said portion of the periphery of said balls, for permitting motion of said fingers relative to said given insertion direction after the force of said compression springs is overcome by said protuberances, and a stop disposed on each respective end of said fingers for contacting an outer surface of said beam.

5. Apparatus according to claim 3, including a lever engaged by said other end of said finger, and a switch being operated by said lever for indicating relative motion of said finger.

6. Apparatus according to claim 4, including a lever engaged by said end of said finger, and a switch being operated by said lever for indicating relative motion of said finger.

7. Apparatus according to claim 1, wherein said guiding means are in the form of tracks fastened to said common base plate.

8. Apparatus according to claim 1, including means disposed between said guiding means and said receptacle for supporting said fingers.

9. Apparatus according to claim 1, including another beam disposed perpendicular to said first-mentioned beam and other fingers engaged by said other beam, said other fingers being staggered in height relative to said first-mentioned fingers permitting simultaneous testing of fuel assemblies from two sides.

* * * * *